(12) United States Patent
Chiddister

(10) Patent No.: US 6,289,602 B1
(45) Date of Patent: Sep. 18, 2001

(54) STRAIN GAGE EXHAUST GAS RECIRCULATION VALVE SENSOR

(75) Inventor: H. Scott Chiddister, St. Joseph, MI (US)

(73) Assignee: CTS Corporation

( * ) Notice: Subject to any disclaimer, the term of this patent is extended or adjusted under 35 U.S.C. 154(b) by 0 days.

(21) Appl. No.: 09/239,167

(22) Filed: Jan. 28, 1999

(51) Int. Cl.[7] .................................................. G01B 3/22
(52) U.S. Cl. .................................. 33/833; 33/DIG. 13
(58) Field of Search ............................. 33/710, 832, 833, 33/DIG. 13; 73/855

(56) References Cited

U.S. PATENT DOCUMENTS

| | | | |
|---|---|---|---|
| 2,018,777 | * | 10/1935 | Edwards ................................... 33/833 |
| 4,622,751 | * | 11/1986 | Berg ................................ 33/DIG. 13 |
| 5,077,909 | * | 1/1992 | Cranor .................................... 33/833 |
| 5,535,631 | * | 7/1996 | Paine ...................................... 73/855 |
| 5,811,967 | | 9/1998 | Shank et al. . |

* cited by examiner

Primary Examiner—G. Bradley Bennett
(74) Attorney, Agent, or Firm—Mark P. Bourgeois; Mark W. Borgman

(57) ABSTRACT

An exhaust gas recirculation valve sensor has a housing with a cavity. A shaft is located in the cavity and extends out of the cavity into contact with a portion of the EGR valve. A sensor mechanism is located in the cavity and generates an electrical signal proportional to the amount of force applied. A spring mechanism is located between the shaft and the sensor mechanism to translate movement of the shaft into a variable force on the sensor mechanism. The variable force on the sensor mechanism causes the electrical signal to change. The sensor mechanism includes a substrate and a strain gage resistor that is mounted on the substrate. The spring mechanism includes a sleeve attached to the shaft and a coil spring.

6 Claims, 2 Drawing Sheets

US 6,289,602 B1

STRAIN GAGE EXHAUST GAS RECIRCULATION VALVE SENSOR

BACKGROUND OF THE PREFERRED EMBODIMENT(S)

1. Field of the Preferred Embodiment(s)

This invention generally relates to position sensing and to a position sensor which is compact, durable and precise. More specifically, the invention relates to an exhaust gas recirculation valve sensor.

2. Description of the Related Art

Position sensing is used to allow an electrical circuit to gain information about an event or a continuously varying condition. There are a variety of known techniques for position sensing. For example, optical, electrical, electrostatic, and magnetic fields are all used in a sensor to measure position. There are many known sensors such as resistive contacting networks, inductively coupled ratio sensors, variable reluctance devices, capacitively coupled ratio detectors, optical detectors using the Faraday effect, photo-activated ratio detectors, and electrostatic ratio detectors.

There are many applications for sensors, and a wide variety of technologies to fill these needs. Each of these technologies offers a unique set of advantages and limitations. Of these applications, exhaust gas recirculation (EGR) valve sensing, is known to have its own unique requirements. An EGR valve sensor must be compact and rugged to resist the severe vibration, temperature and chemical exposure when mounted on an internal combustion engine.

Description of Related Art

Examples of patents related to the present invention are as follows, wherein each patent is herein incorporated by reference for related and supporting teachings:

U.S. Pat. No. 5,811,967 is a EGR valve linear position sensor having variable coupling transformer.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, applicants' claimed invention.

Problems with the Prior Art

There are several problems that exist with the prior art that are addressed by the preferred embodiment. One problem with the prior art contacting EGR sensors is wear. As the valve moves, over time the contacting parts of the sensor can wear out and fail. Further, due to the harsh environment, environmental contaminants can accelerate the failure of the contacting resistance system. Engine compartments are becoming more cramped due to more engine functions being added. A more compact sensor is desired. Other approaches such a magnetic sensors are susceptible to reversible performance degradation during high temperatures which require costly electronics to compensate for these temperature effects.

This and other problems will be solved by the preferred embodiments of the invention. A review of the specification, drawings, and claims will more clearly teach a skilled artisan of other problems that are solved by the preferred embodiments.

SUMMARY OF THE PREFERRED EMBODIMENT(S)

It is a feature of the invention to provide a linear position sensor operable to sense the movement of an object, including a housing having a cavity. A shaft is located in the cavity and extends out of the cavity into contact with the object. A sensor mechanism is located in the cavity, for sensing force and for generating an electrical signal proportional to the amount of force applied to the sensor mechanism. A spring mechanism is located between the shaft and the sensor mechanism, for translating movement of the shaft into a variable force on the sensor mechanism. The spring mechanism is compressed and decompressed as the object moves. The variable force on the sensor mechanism causes the electrical signal to change. An electrical connector extends through the housing and is connected to the sensor mechanism. The sensor mechanism includes a substrate and a strain gage resistor that is mounted on the substrate. The spring mechanism includes a sleeve attached to the shaft and a coil spring that has a first end and a second end. The first end is disposed in the sleeve and the second end is disposed adjacent the substrate.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

BRIEF DESCRIPTION OF THE DRAWINGS

These and other features of the invention can best be understood by the following description of the accompanying drawings as follows.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENT

Figure 1:
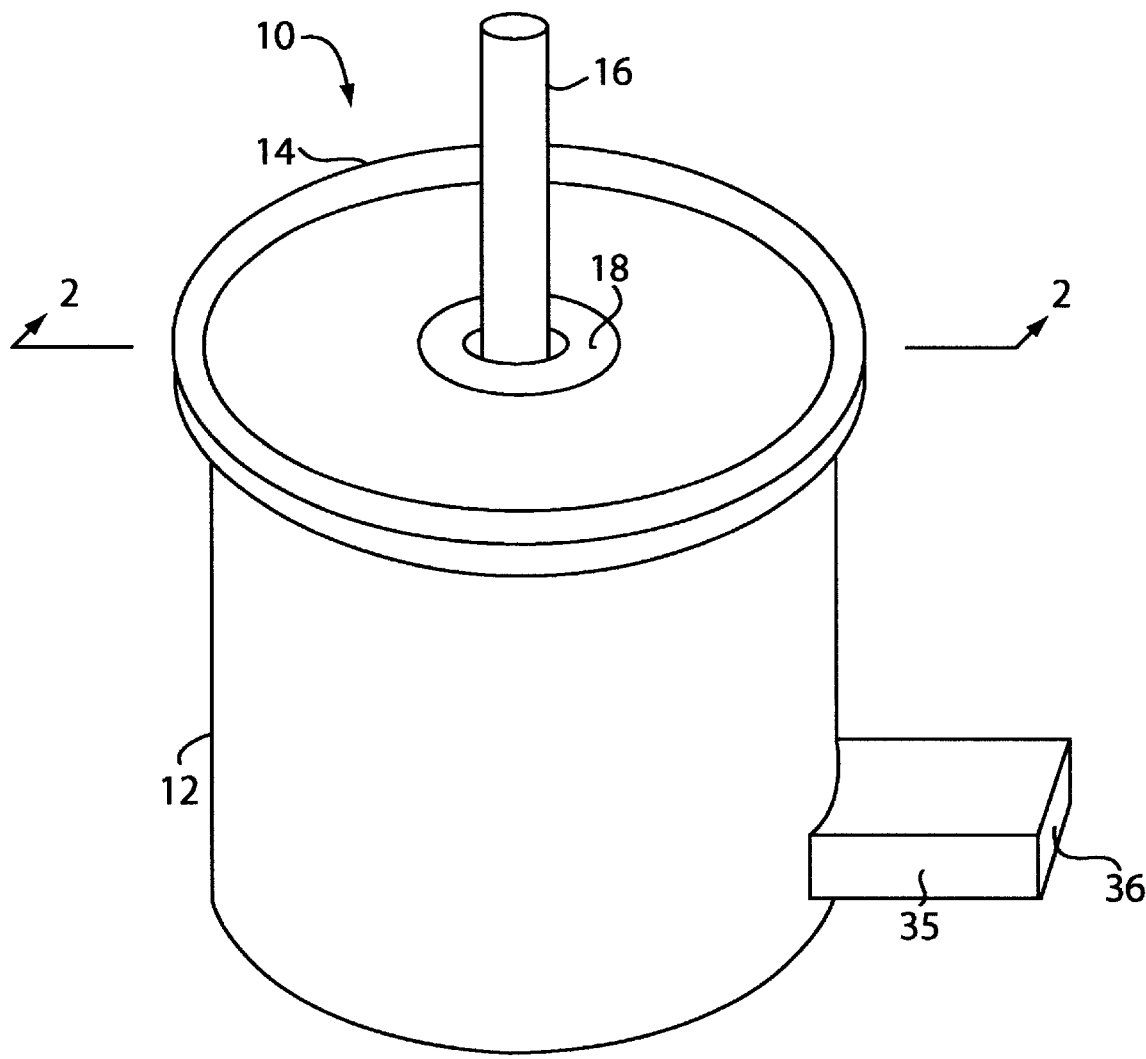
FIG. 1 is a perspective view of the EGR valve sensor.
Figure 2:
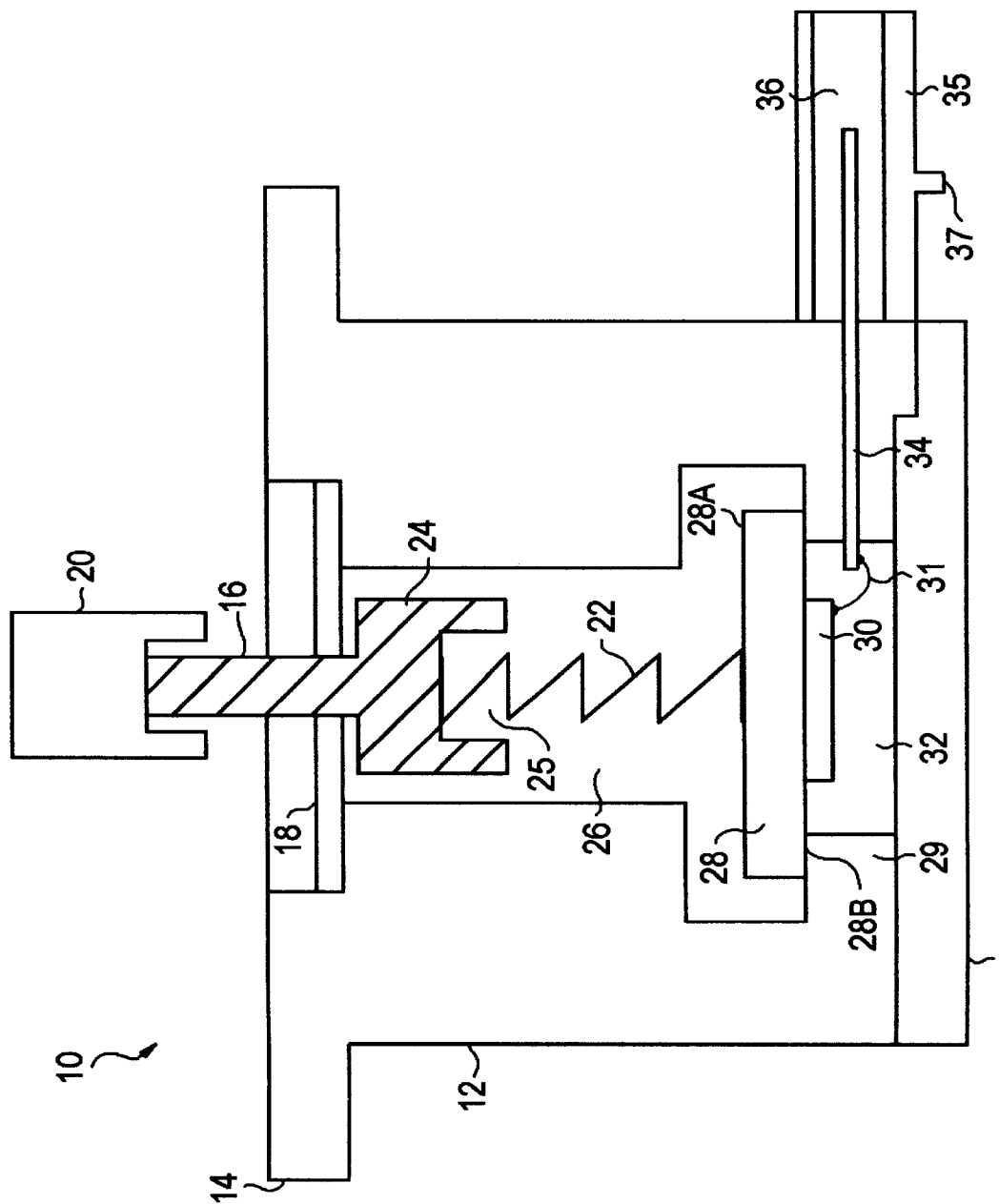
FIG. 2 is a cross-sectional view of the position sensor of FIG. 1 taken along section line 2—2.

Referring to FIGS. 1 and 2, there is an exhaust gas recirculation (EGR) valve sensor 10. A housing 12 contains the sensor components. A flange 14 is used to fasten the sensor 10 to another structural support such as the exhaust gas recirculation valve, typically by crimping around flange 14. A shaft 16 extends up through cover 18 on the top of the housing. Shaft 16 is designed to engage an extension 20 of the EGR valve whose position is desired to be sensed. A cover 18 covers the opening through which shaft 16 extends. A bottom cover 19 covers the bottom of housing 12.

Connected to one end of shaft 16 is a sleeve 24. Sleeve 24 has a recess 25 into which first end 21 of spring 22 fits into. Sleeve 24 retains first end 21 of spring 22. The spring 22 is located in cavity 26 inside housing 12. A ceramic substrate 28 is located in cavity 26 and supported by an annular support 29. Ceramic substrate 28 has a top side 28A and a bottom side 28B. Second end of the spring 22 rests on top side 28A. Spring 22 is in compression between shaft 16 and substrate 28. Below substrate 22 a wire bond cavity 32 is formed. A strain gauge resistor 30 is disposed on bottom side 28B and extends into wire bond cavity 32. Resistor 30 is a conventional thick film strain gage resistor fabricated using conventional thick film materials. A conventional ultrasonic wire bond 31 electrically connects resistor 30 to a connector pin 34. Another wire bond (not shown) connects the other end of resistor 30 to another connector pin (not shown). Wire bond 31 is typically a gold wire but can be aluminum. Connector pin 34 extends into connector recess 36 which is surrounded by a connector shroud 35. Connector shroud 35 extends from housing 12 and has a connector latch tab attached thereto. Pins 34, recess 36, shroud 35 tab 37 allow sensor 10 to be connected with a wiring harness (not shown) or other external wiring (not shown).

The assembly of the EGR valve sensor 10 is as follows: Ceramic substrate 28 is placed on support 29 in cavity 26. An adhesive may be placed to hold substrate 28 on support 29 if desired. Next, spring 22 is inserted in sleeve 24 and both are inserted into cavity 26. Cover 18 is then placed over shaft 16 and heat staked in place. Wire bonds 31 are placed connecting resistor 30 to pins 34. The pins 34 are insert molded in placed during injection molding of housing 12. Cover 19 is heat staked in place to complete the assembly.

Operation of the Preferred Embodiment

The operation of the EGR valve sensor 10 is described next. As the EGR valve extension 20 moves downwardly, shaft 16 moves inwardly, spring 22 is compressed and applies a force or stress to substrate 28 which in turn applies a stress to strain gauge resistor 30. The changing stress in resistor 30 causes its resistance to change or conversely the magnitude of an applied voltage to resistor 30 to change. The change in resistance or voltage is proportional to the amount of stress on the resistor which is proportional to the position of the shaft 16 and the EGR valve. Similarly, as the EGR valve extension 20 moves upwardly, shaft 16 moves outwardly, spring 22 is decompressed and the force or stress to substrate 28 is reduced which in turn reduces stress to strain gauge resistor 30 and causes the resistance or voltage to change again.

Remarks about the Preferred Embodiment

One of ordinary skill in the arts of sensors, and more particularly the art of designing EGR valve sensors, will realize many advantages from using the preferred embodiment. In particular, the EGR valve position sensor allows the sensor to not have any contacting parts that can wear out of the life of the vehicle. Further, one skilled in the art will realize that the EGR valve sensor can be easily manufactured at a low cost.

Variations of the Preferred Embodiment(s)

One of ordinary skill in the art of making position sensors will realize that there are many different ways of accomplishing the preferred embodiment. For example, it is contemplated to make the substrate 28 out of another material besides ceramic such as FR4 or kapton.

Even though, the embodiment discusses the use of a coil spring 22. It is contemplated to use leaf springs or other types of springs. Also more than one spring could be used.

Additionally, although it is illustrated that the sleeve 24 is integral to shaft 16. It is contemplated to fasten the shaft to a separate sleeve or other type of spring retainer. The spring could also be attached to the shaft by welding or an adhesive. The covers 18 and 19 were shown mounted using heat staking. Other suitable fastening means such as a adhesives, or mechanical fasteners could be used.

The sensor shown in the preferred embodiment was a resistor 30. It is contemplated that other sensors such as a piezoelectric crystal could be utilized.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by Letters Patent is:

1. A position sensor operable to sense the movement of an attached object, comprising:

a) a housing having a cavity;

b) a shaft, located in the cavity and extending out of the cavity into contact with the object;

c) a substrate, disposed in the cavity, the substrate having a first side and a second side;

d) a strain gauge resistor, located on the second side of the substrate; and e) a spring, located between the shaft and the substrate, the spring having a first end retained by the shaft and a second end disposed adjacent the first side of the substrate so that the spring is compressed and decompressed as the object moves, the spring compression and decompression causing the substrate to be stressed and the resistor to change resistance, the resistor protected from contact with the spring by the substrate.

2. The position sensor according to claim 1, wherein the shaft has a sleeve into which a first end of the spring is retained.

3. The position sensor according to claim 1, wherein an electrical connector connects the strain gauge resistor to an external electrical circuit located outside the housing.

4. The position sensor according to claim 3, wherein the electrical connector includes a pin and a wire bond connecting the pin to the strain gage resistor.

5. A position sensor operable to sense the movement of an attached object, comprising:

a) a housing having a cavity;

b) a shaft, located in the cavity and extending out of the cavity and having a sleeve;

c) a ceramic substrate, disposed in the cavity, the substrate having a first side and a second side;

d) a strain gauge resistor, located on the second side of the substrate;

e) an electrical connector extending outside the housing and electrically connected to the resistor; and f) a spring having a first end located in the sleeve and a second end located on the first side of the substrate, so that the spring is compressed and decompressed as the object moves, the spring compression and decompression causing the resistor to change resistance as the object moves, the resistor protected from contact with the spring by the substrate.

6. The position sensor according to claim 5, wherein the electrical connector includes a pin and a wire bond connecting the pin to the strain gage resistor.

* * * * *